(12) United States Patent
Aitchison (10) Patent No.: US 11,828,590 B2
(45) Date of Patent: Nov. 28, 2023

(54) GEOSYNTHETIC SENSOR ARRAY

(71) Applicant: IMAGINE INTELLIGENT MATERIALS LTD, Victoria (AU)

(72) Inventor: Phillip Aitchison, Menai (AU)

(73) Assignee: IMAGINE INTELLIGENT MATERIALS LTD, Geelong North (AU)

( * ) Notice: Subject to any disclaimer, the term of this patent is extended or adjusted under 35 U.S.C. 154(b) by 0 days.

(21) Appl. No.: 17/531,180

(22) Filed: Nov. 19, 2021

(65) Prior Publication Data

US 2022/0074730 A1    Mar. 10, 2022

Related U.S. Application Data

(63) Continuation of application No. 16/632,528, filed as application No. PCT/AU2018/050762 on Jul. 20, 2018.

(30) Foreign Application Priority Data

Jul. 20, 2017    (AU) .................. 2017902840

(51) Int. Cl.
| | |
|---|---|
| *G01L 1/00* | (2006.01) |
| *G01B 7/16* | (2006.01) |
| *D01F 9/12* | (2006.01) |
| *E02D 17/20* | (2006.01) |
| *G01L 1/20* | (2006.01) |
| *G01M 5/00* | (2006.01) |
| *G01D 5/24* | (2006.01) |

(52) U.S. Cl.
CPC ............ *G01B 7/18* (2013.01); *D01F 9/12* (2013.01); *E02D 17/202* (2013.01); *G01D 5/24* (2013.01); *G01L 1/205* (2013.01); *G01M 5/0083* (2013.01); *G01N 2203/0617* (2013.01)

(58) Field of Classification Search
CPC .......... G01B 7/18; D01F 9/12; E02D 17/202; G01D 5/24; G01L 1/205; G01M 5/0083; G01N 2203/0617
See application file for complete search history.

(56) References Cited

U.S. PATENT DOCUMENTS

| | | | |
|---|---|---|---|
| 2008/0271999 A1* | 11/2008 | Jones | B01D 61/56 |
| | | | 204/450 |
| 2012/0090400 A1* | 4/2012 | Hatami | E02D 17/202 |
| | | | 264/105 |

FOREIGN PATENT DOCUMENTS

| | | |
|---|---|---|
| WO | 2017132734 A1 | 8/2017 |
| WO | 2017177269 A1 | 10/2017 |
| WO | 2019014725 A1 | 1/2019 |

* cited by examiner

*Primary Examiner* — Max H Noori
(74) *Attorney, Agent, or Firm* — AEON Law, PLLC; Adam L. K. Philipp; David V. H. Cohen (57) ABSTRACT

A geosynthetic sensor that incorporates an arrangement of a first layer of lengths of electrically conductive geosynthetic and a second layer of lengths of electrically conductive geosynthetic where each said length undergoes a change in electrical resistance or capacitance when subject to changes in any one or more of: pressure; strain; water content; or temperature.

20 Claims, 4 Drawing Sheets

GEOSYNTHETIC SENSOR ARRAY

CROSS-REFERENCE TO RELATED CASES

This application is a continuation of non-provisional U.S. patent application Ser. No. 16/632,528, filed Jan. 20, 2020, titled GEOSYNTHETIC SENSOR ARRAY, and naming inventor AITCHISON, Phillip. The entire contents of the above-referenced applications and of all priority documents referenced in the Application Data Sheet filed herewith are hereby incorporated by reference for all purposes.

TECHNICAL FIELD

The invention relates to the field of monitoring pressure, strain and/or moisture in civil engineering applications. In particular, the invention relates to an electrically conductive geosynthetic and a method for using same.

BACKGROUND OF THE INVENTION

Geosynthetics are synthetic products used to stabilise terrain in civil engineering applications including: airfields; bank protection; canals; coastal engineering; dams; debris control; embankments; erosion; railroads; retaining structures, reservoirs; roads; sand dune protection; slope stabilisation; storm surge; stream channels; swales and; wave action.

The main categories of geosynthetics are: geotextiles, geogrids, geonets, geomembranes, geosynthetic clay liners (GCL), geofoam, geocells and geocomposites.

Geotextiles are widely used as protective layers in civil engineering. They help stabilise terrain, act as filtration media and cushioning. They are often used on a large scale, potentially involving many thousands of square meters of area.

Geomembranes are used as barrier layers to water, such as pond liners and usually require protection against damage to ensure they remain a barrier. Even a small hole in the liner can result in significant water leakage, especially over time. In some cases, for example mining waste water, where the water is contaminated and is being retained or directed to protect the environment, even small amounts of leakage are significant and can cause substantial environmental harm and thus cost to rectify. In such applications, the integrity of the liner is critical. In other applications, such as where water is being retained for further use, loss of water has a value which merits investment in ensuring barrier integrity.

In most of these applications it would be of benefit to monitor changes in the environment of the geosynthetic, such as: pressure, strain, environmental water content and/or temperature. However, current technologies for measuring such properties are complex and expensive, requiring sophisticated sensors to be wired directly into the environment. Consequently, few of those technologies are economically viable except in the highest value environments.

Accordingly, it is an object of the invention to provide a geosynthetic material that ameliorates at least some of the problems associated with the prior art.

SUMMARY OF THE INVENTION

According to a first aspect of the invention, there is provided a sensor array that incorporates an arrangement of at least a first and second layer of lengths or strips of electrically conductive geosynthetic; wherein each said length or strip undergoes a change in electrical resistance or capacitance when it is subject to changes in any one or more of: external pressure; strain; water content; or temperature.

According to a second aspect of the invention, there is provided a sensor array that incorporates an arrangement of at least a first and a second layer of lengths or strips of electrically conductive geosynthetic, wherein a change in electrical resistance or capacitance between one or more of the lengths or strips in the first layer and one or more of the lengths or strips in the second layer can be used to detect a change in any one or more of: external pressure; strain; water content; or temperature.

Preferably, one or both of the geosynthetic layers are composed of a geotextile. They may also be composed of any one of: geomembrane; geogrid; geomesh; geonet; GCL; geofoam; geocell; or geocomposite.

Preferably, at least one of the first or second layers is composed of lengths of electrically conductive geosynthetic that, at the voltages used to measure resistance or capacitance, are electrically isolated from adjacent lengths in the layer; and at voltages much higher than those used to measure resistance or capacitance are electrically connected. This embodiment allows the sensor matrix to retain the ability to act as the electrical earth in spark inspection of geomembranes as well as acting as a sensor for pressure, strain, temperature and/or water.

Preferably, the geosynthetic is fabricated with at least two separate electrical paths which connect each end of each length of geosynthetic, and wherein said paths can be electrically connected at one end of the length of geosynthetic so that the electrical resistance can be measured between two electrical paths at the opposing ends of the geosynthetic.

Preferably, the lengths of geosynthetic in at least one of said layers have an electrical resistance that differs on each opposing surface. In one embodiment, the surfaces of highest electrical conductivity of the first layer are arranged in closest proximity to the surfaces of highest electrical conductivity of the second layer.

In an alternative embodiment, the surfaces of highest electrical conductivity of the first layer are arranged in furthest proximity from the surfaces of highest electrical conductivity of the second layer.

In a further alternative embodiment, the surfaces of highest electrical conductivity of the first layer are arranged in closest proximity to the surfaces of lowest electrical conductivity of the second layer; and wherein the surfaces of highest electrical conductivity of the second layer are arranged in furthest proximity from the surfaces of highest electrical conductivity of the first layer.

According to another aspect of the invention, there is provided the use of a sensor array according to any preceding claim wherein resistance is measured between each end of each of said lengths of geosynthetic.

According to another aspect of the invention, there is provided an electrically conductive geosynthetic with one or more electrical pathways that change in resistance and/or capacitance when any one or more of the following change: external pressure, strain, water presence or temperature. Preferably, said geosynthetic contains a textile (and/or fibres) incorporating conductive carbon or metal onto or into the textile and/or fibres. Preferably, the conductive carbon is primarily graphene.

Said geosynthetic may be one of a geomembrane; a geogrid; a geomesh; a geonet; a GCL; a geofoam; a geocell; or a geocomposite. Preferably, the electrical conductivity is provided by a coating containing graphene on the geosynthetic and/or any fibres composing the geosynthetic or is provided by graphene incorporated into polymer comprising the geosynthetic.

Graphene is essentially an individual layer of graphite and can be formed by many routes, including "top-down" approaches such as mechanical or electrochemical exfoliation of graphite, chemical oxidation of graphite and exfoliation as graphene oxide followed by partial or complete reduction to graphene; and "bottom-up" approaches such as growth from gases or plasmas on substrates or catalysts.

The character of the graphene can vary from nearly atomically perfect single layers through two-layer, few-layer and multi-layer graphene all the way up a number of layers that produce large agglomerates, similar to ultra-fine graphite.

Graphene has a high aspect ratio, being ultimately only one atomic layer thick (less than one nanometre) and typically hundreds of nanometres to hundreds of microns in the planar directions. Thus, graphene is referred to as being a two-dimensional (2D) material. Graphene is an excellent electrical conductor.

The area of electrical conductivity of the geosynthetic may cover the entire geosynthetic, and in one embodiment may cover the entire geosynthetic except for the edges of the geosynthetic, which are electrically insulating.

The geosynthetic may incorporate two or more areas of electrical conductivity separated by one or more electrically insulating areas. Preferably, at least one of the electrically conducting areas undergoes a change in electrical resistance and/or capacitance when changes occur in one or more of: external pressure, strain, water content or temperature.

Preferably, one or more specific electrical connections are provided between said of the areas of electrical conductivity, thereby to create a circuit. Advantageously, the electrically insulating area has an electrical resistance equal to or greater than 5000 Ohms per square and the area of electrical conductivity has an electrical resistance between 1 and 5000 Ohms per square. Preferably, the electrical conductivity of all of the geosynthetic is sufficient to allow electrical spark or arc inspection for holes in an overlaying geomembrane.

Preferably, the electrical conductivity is provided by a coating containing graphene on each side of the geosynthetic, and wherein each said coating is substantially electrically isolated from the other. In one embodiment, said coating is applied in a continuous length on a first side of the geosynthetic and as a discontinuous coating in a periodic pattern on a second side of the geosynthetic.

Preferably, said discontinuous coating is arranged such that, when said geosynthetic is arranged in adjacent parallel lengths, one or more continuous electrical pathways can be created through the periodic coating in a direction perpendicular to the orientation direction of the lengths of said geosynthetic.

An electrically conductive geotextile provides a method by which electrical inspection of the geomembrane barrier liner can be performed. PCT Patent Application PCT/AU2017/050091 describes such a conductive geotextile and PCT Patent Application PCT/AU2017/050322 describes the use of a conductive geotextile in a geosynthetic clay liner. These items of prior art describe how an inspection can be conducted prior to a dam, reservoir, tank or landfill being filled with water or waste. To monitor the integrity of such a system over time a different technique is required.

Geotextiles can be made electrically conductive as described in PCT Patent Application PCT/AU2017/050091.

Graphene is one method by which a geosynthetic can be made conductive. Other methods include the addition of other electrically conductive species to the geosynthetic. These electrically conductive materials may be present as coatings on the geosynthetic or coatings on fibres comprising or contained in the geosynthetic. They may be metal fibres or other electrically conductive species such as carbon fibres. In some cases, additives to the fibres may make them electrically conductive.

It is generally advantageous to use geotextiles that maintain their beneficial properties, such as porosity, strength, resistance to penetration and cushioning, however there are potential situations where a non-textile conductive layer can be used for sensing.

Now will be described, by way of specific, non-limiting examples, preferred embodiments of the invention with reference to the drawings.

DETAILED DESCRIPTION OF THE INVENTION

Sensing in geotechnical fields (e.g. civil engineering) covers a broad range of requirements from ultra-high precision monitoring of very high value assets, such as bridges and concrete dams, to measurement of temperatures in waste deposits or water leaks, to roads and rail monitoring. Often the high value measurements are referred to as "structural health monitoring". Very few cost-effective options are available for large-scale monitoring of lower value assets where sensor installation and monitoring costs can become a substantial proportion of the asset value.

Low cost, large-area sensors made using geotextiles have been demonstrated to be reliable and cost-effective. However, this type of sensing over longer time-frames is difficult. This invention allows an array of conductive geosynthetics to act as large-area sensors with the accuracy and precision required for use in geotechnical and construction environments.

Figure 1:
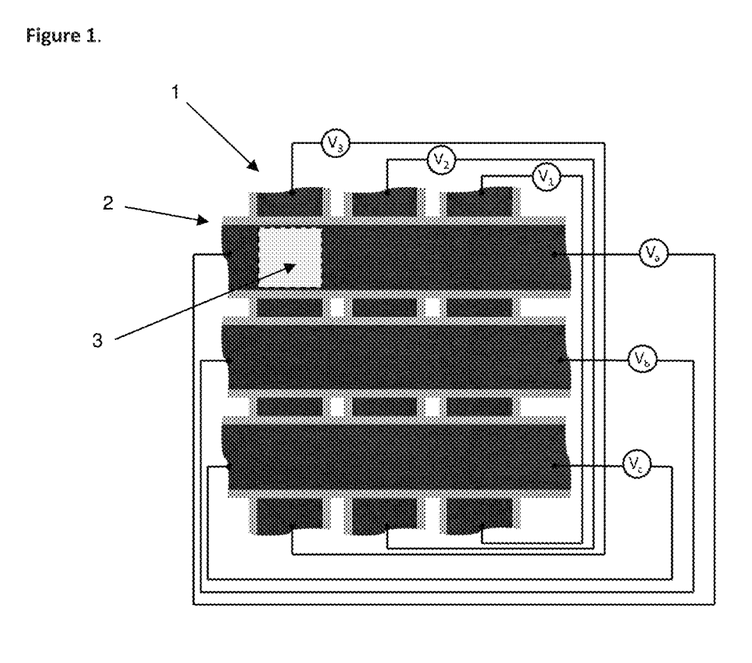
FIG. 1 is a schematic representation of an array of lengths of electrically conductive geotextile according to one embodiment of the invention.

FIG. 1 is a schematic representation of an array of geotextile lengths in two layers. A first layer of first geotextile lengths is laid at right angles to a second layer of second geotextile lengths. The first and second lengths are comprised of non-woven geotextile coated on one side with electrically conductive coating. The coating does not cover all the width of the geotextile lengths, leaving edges that are electrically insulating.

The geotextile lengths in each layer are shown with a separation, however it will be understood that a separation is not necessary if the adjacent geotextile lengths remain electrically isolated from each other at the voltages used to measure resistance and/or capacitance. The geotextile lengths in each layer are substantially electrically isolated from the geotextile lengths in any other layer. The resistance is shown as being measured by a circuit ($V_n$) connected to each of the ends of each of the lengths (where $V_n$ represents each of the measurement circuits $V_1$, $V_2$, $V_3$, $V_a$, $V_b$, $V_c$ ... $V_n$). In this arrangement, each of the lengths gives a response to pressure, strain, water or temperature. The location of the cause of the change in resistance can be identified by comparing which of the lengths in the first layer gives a response and which of the lengths in the second layer gives a response. The intersection of the identified lengths is the location of the change in resistance.

In other cases, each of the lengths may undergo a change in capacitance when exposed to strain, pressure, water or temperature. In such a case, the measurement circuit may be different, but the concept of location is the same, each length is an independent sensor and location is achieved by cross referencing the responses.

In detail, in FIG. 1 a first layer of lengths of electrically conductive geotextile (1) is laid out in a way such that the conductive portion of each length of geotextile is electrically isolated from the adjacent lengths of geotextile in the first layer. A second layer of lengths of electrically conductive geotextile (2) is then laid over the top of the first layer, oriented in a perpendicular direction relative to the first layer, also maintaining electrical isolation from the adjacent lengths in the second layer.

The lengths of geotextile are coated with a conductive layer on one side of the geotextile. The lengths in the first layer are arranged so that the conductive face of the geotextile is in direct contact with the electrically insulating face of the lengths in the second layer. When a change in environment occurs, such as the application of pressure, one or more of the lengths in each layer undergoes a change in electrical resistance.

The application of pressure in the highlighted common area (3) results in a change in resistance in the first length of geotextile (1) and a change in resistance in the second length of geotextile (2). These changes in resistance can be measured by a voltammeter. In FIG. 1, a first voltammeter ($V_3$) and a second voltammeter ($V_a$) will show a change in resistance. Cross referencing the measured voltages allows the common area (3) to be identified as the location of the change in applied pressure. If the arrangement of the lengths of geotextile is known, then the location of the change in pressure can be identified.

The geosynthetic illustrated in FIG. 1 will similarly undergo a change in electrical resistance due to compression or strain or temperature or water content.

Figure 2:
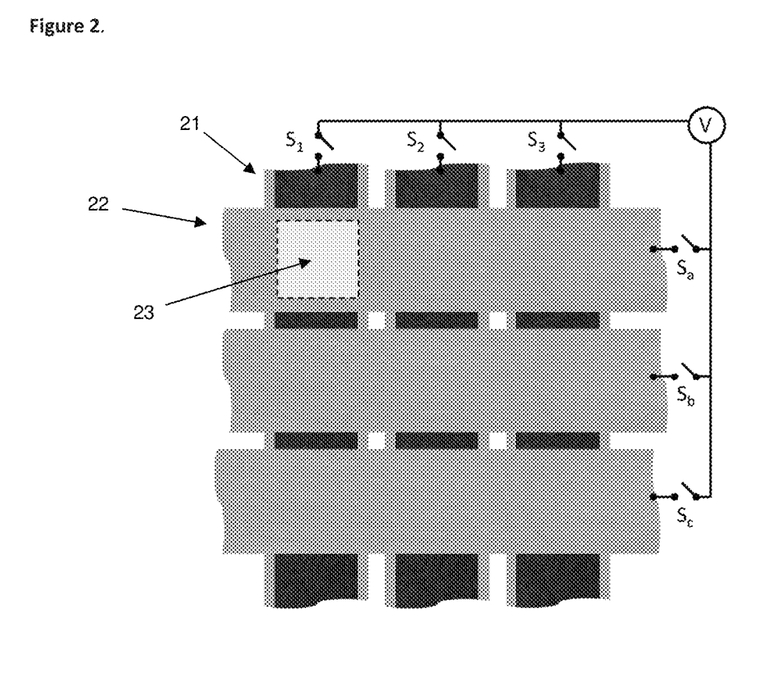
FIG. 2 is a schematic representation of an array of lengths of electrically conductive geotextile according to an alternative embodiment of the invention.

FIG. 2 is a schematic representation of an array of geotextile lengths similar to those described in FIG. 1, except that the electrically conducting surfaces are arranged to face one another. FIG. 2 illustrates an array of lengths of geotextile that in themselves do not undergo a substantial change in resistance, but at the area of connected response (23) the resistance between the first length of geotextile (21) and the second length of geotextile (22) changes when subjected to a change in pressure, strain, temperature or water content. The change in electrical resistance in area (23) results in a change in the resistance of a circuit made through the first length of geotextile (21) and the second length of geotextile (22). The resistance can be monitored by a voltammeter (V) which can either be permanently connected, but more reasonably is switched in to create a circuit using switch (Si) and switch (Sa). Such a switching system can monitor many lengths of geotextile, especially if automated.

In FIG. 2 the layers are arranged so that the lengths in the first layer are in electrical contact with the lengths in the second layer. When a change in strain, pressure, water content or temperature occurs the resistance and/or capacitance between at least one lengths in the first layer and at least one length in the second layer changes. The change in resistance and/or capacitance is measured by a circuit that connects the first length to the second length. In this case the measurement circuit is shown as a series of switches (Se) connected to a measurement device (V). In this arrangement, the sensor is the interaction between at least one length in each layer. Depending on the nature of the material used to make the lengths, the lengths may be configured in many arrangements of conductivity.

Many permutations of the arrangements illustrated in FIG. 1 and FIG. 2 are possible. These include using various combinations of geosynthetic, such as where the first layer consists of lengths of geotextile and the second layer consists of lengths of geotextile. In other embodiments, the first layer can consist of lengths of any one of: a geotextile or geogrid or GCL or geomembrane or geomesh or geonet or geofoam or geocell or geocomposite; and the second layer can consist of any one of a geotextile or geogrid or GCL or geomembrane or geomesh or geonet or geofoam or geocell or geocomposite.

Figure 3:
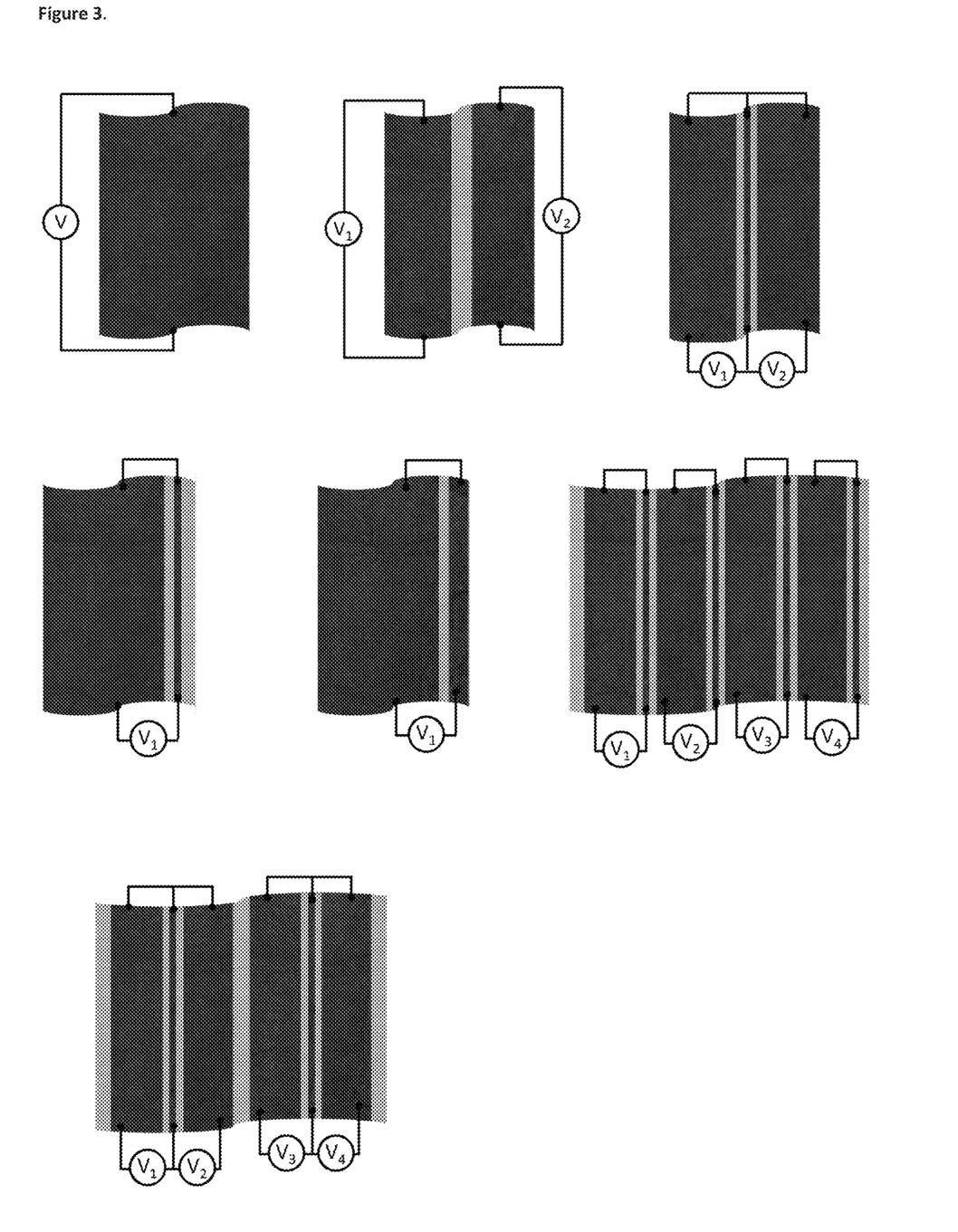
FIG. 3 shows several possible arrangements of the conductive portions of the conductive geotextile according to the invention.

FIG. 3 shows several possible alternative arrangements of the conductive portions of the lengths and associated connection points for the measurement circuit described above. Each of the configurations offers advantages and disadvantages depending on the nature of the materials in the lengths, the process used to create conductivity and the environment under which the array is applied. The example of coated geotextile is used for illustration with the non-conductive geotextile denoted in light grey, whilst the electrically conductive coating is shown in dark grey.

Figure 4:
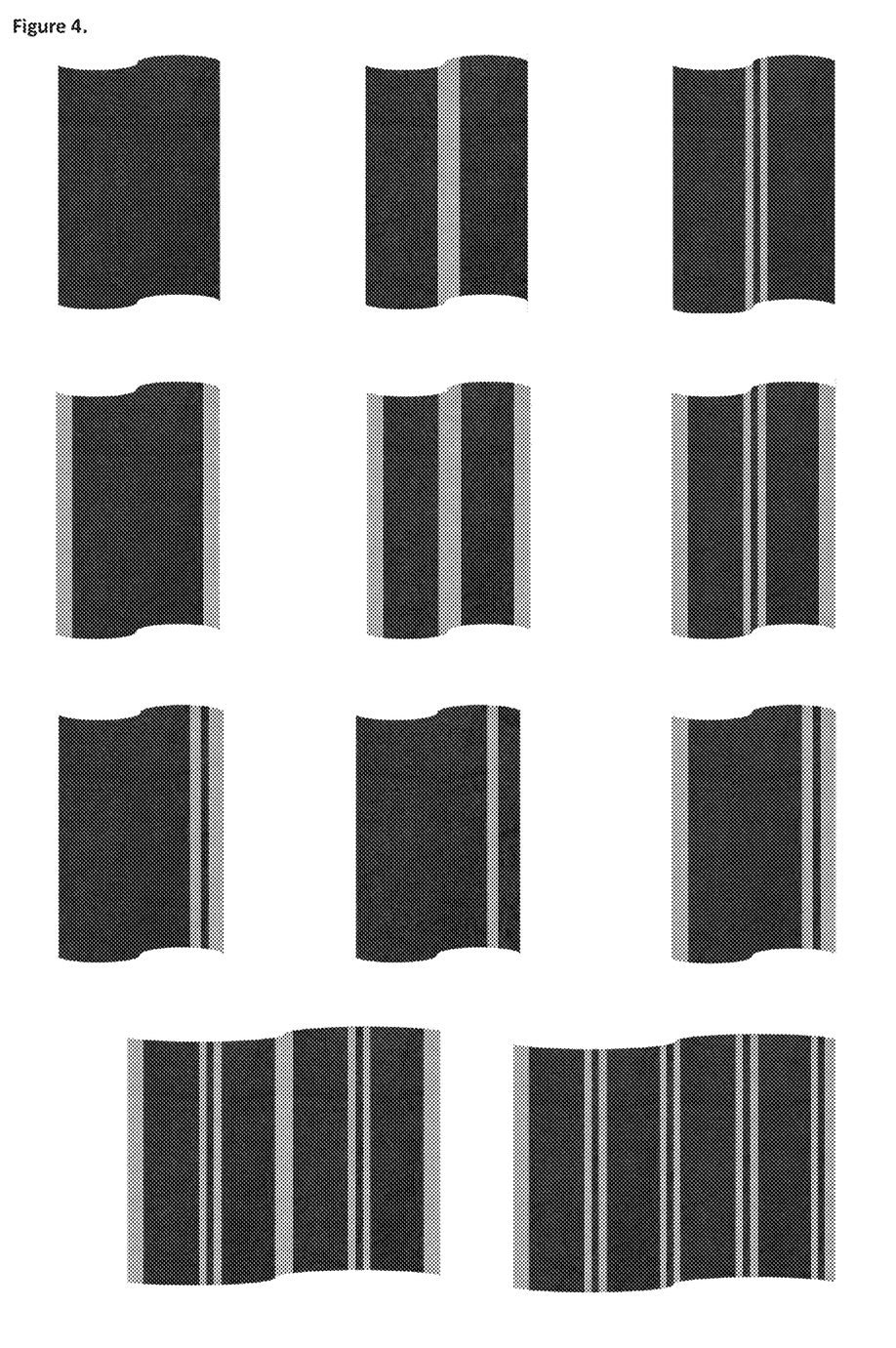
FIG. 4 shows several possible arrangements of conductive portions of the lengths of coated geotextile according to the invention.

FIG. 4 shows several possible alternative arrangements of conductive portions of the lengths of coated geotextile. In some cases, the electrically conductive coating covers all of the width of the geotextile. In other embodiments, non-conductive areas are left to separate conductive portions that are used to create a circuit that may allow easier testing for changes in resistance and/or capacitance.

In a further embodiment, the layers of conductive geosynthetic can be separated by a third layer of geosynthetic that is substantially an electrical insulator, but which allows an electrical interaction between the two electrically conductive layers to change when subject to pressure, strain, changes in water content or changes in temperature.

In some embodiments, the resistance of a circuit is measured, in others it is the capacitance or inductance of the circuit.

In an alternative embodiment, the lengths of geotextile are electrically conductive on both sides, whilst maintaining electrical insulation between the two sides. When subject to compression the separation between the two conductive sides decreases and the capacitance increases. Additionally, the resistance between the two sides may decrease as at least one part of each of the two sides approaches the other.

To maximise the area that can be monitored it is desirable to minimise areas that are not sensitive to changes in environmental conditions. To this end the electrically insulating spaces between the conductive areas of the lengths of geosynthetic in a layer should be minimised. Further, the geosynthetic can be enabled to perform at least one additional function in addition to being a sensor. Large spaces between the lengths of geosynthetic will usually reduce the effectiveness of that additional function (for example, cushioning or filtering or barrier properties).

In the case where at least one of the electrically conductive geosynthetic layers is used for electrical hole detection (spark or arc inspection), non-conductive areas are undesirable. However, for the sensor array to work effectively, each element of the array must be electrically isolated from the others. Electrical hole detection does not require high electrical conductivity, so it is possible to make the nominally electrically insulating areas low electrical conductivity and still maintain a sufficiently electrically insulated sensing array.

For example, electrical hole detection using arc or spark testing according to standards ASTM D6747-15 and ASTM D7852-13 can be readily conducted using geosynthetics (specifically geomembranes and geotextiles) with electrical sheet resistances of greater than 5000 Ohms per square, and in some cases greater than 100,000 Ohms per square.

Using areas of relatively high electrical conductivity as the active element of the sensor and areas of relatively low electrical conductivity as the electrical separation between adjacent active areas can allow uniform electrical hole detection according to standards ASTM D6747-15 and ASTM D7852-13, as well as allowing operation as an array sensor as described herein above.

Electrical resistance can be reported in many ways. For electrical conduction in a thin sheet, the unit "Ohms per square" ("Ohm/sq" or "Ohm/□") is often used and referred to as "sheet resistance". This unit is of practical advantage in that it reflects a desired outcome regardless of how the material being measured is constructed. For example, two sheets of electrical conductor may have different specific resistances but may nevertheless give the same, desirable sheet resistance if present in different thicknesses. Sheet resistance is normally applied to uniform thickness films, but can also be applied to non-uniform sheets of conductors, such as the geotextile or geogrid or GCL or geomembrane or geomesh or geonet or geofoam or geocell or geocomposite described herein.

Electrical measurements rely on electrical conductivity to form a circuit. Sufficient conductivity depends on the size and length of the conductive path and the conductivity of the conductive media. This combination of variables gives a wide range over which the measurements can be effective. Tuning the measurement method to the desired outcome and conditions is required. This allows the electrical conductivity of the geosynthetic to also be tailored to the desired application and measurement methods. In some cases, the electrical conductivity of the conductive geosynthetic can be quite low, such as where the measurement voltage is high, the change in resistance is large and the circuit path is short.

Various forms of graphene exist. Ideal graphene is pure carbon and the best electrical conductor in the graphene family and one of the best conductors ever discovered. It is free of defects and other chemical functionality, such as oxygen.

Graphene oxide (GO) is a highly oxidised form of graphene that is an electrical insulator. Intermediary species can be referred to by various descriptions, such as partially reduced graphene oxide (prGO) or functionalised graphene, where various chemical groups are attached to the edges and/or basal planes of the graphene. This functionality allows tailoring of the electrical and physical properties of the graphene, for example to make it easier to incorporate into or onto materials, such as plastics to form composites.

Incorporation of heteroatoms, where carbon atoms are replaced by other atoms, such as nitrogen and other covalently bonded atoms can also be used to tailor the properties of graphene. Graphene can also come in various dimensions, whether it be single layers of graphene or multiple layers. Various terminologies have been used to describe the structural permutations and some attempts have been made at standardising terminology. Regardless of terminology these single-layer and multi-layer structures of graphene have useful conductivity that give rise to the properties in polymers, fibres and textiles as described here. These various permutations of graphene are generalised here as "graphene" unless otherwise detailed and their properties described. The continuous scale from electrically conductive to electrically insulating means many forms of graphene can be used as an electrical conductor and even poorly conducting graphene can serve the purpose, especially where it's other properties make it desirable for use.

Graphene can be produced by many routes, including: anodic bonding; carbon nanotube cleavage; chemical exfoliation; chemical synthesis; chemical vapour deposition; electrochemical exfoliation; electrochemical intercalation; growth on silicon carbide; liquid phase exfoliation; micromechanical cleavage; microwave exfoliation; molecular beam epitaxy; photo-exfoliation; precipitation from metal, and; thermal exfoliation. Some of these routes give rise to materials referred to as: chemically converted graphene; few-layer graphene; GO; graphene; graphene oxide; graphene nanoflakes; graphene nanoplatelets; graphene nanoribbons; graphene nanosheets; graphite nanoflakes; graphite nanoplatelets; graphite nanosheets; graphite oxide; liquid crystal graphene oxide; LCGO; multi-layer graphene; partially reduced graphene oxide; partially reduced graphite oxide; prGO; rGO; reduced graphene oxide; reduced graphite oxide.

Incorporation of graphene into or onto a geotextile or geogrid or GCL or geomembrane or geomesh or geonet or geofoam or geocell or geocomposite can be achieved by many methods, but in each case the properties of the geosynthetic will affect the method of incorporation.

The use of graphene to make fibres and textiles electrically conductive will depend on the fibre chemistry, graphene chemistry, graphene shape and processes used to incorporate the graphene into or onto the fibres and the process of forming a textile. Preferred methods include mixing the graphene into the polymer prior to forming the fibre. However, it is also possible to coat fibres or a textile with graphene to make the conductive textile.

The graphene can be present as a powder or as a dispersion in a fluid to facilitate dispersion of the graphene in the polymer. Coating the graphene is preferably from a dispersion of graphene in a fluid. Methods of incorporation of graphene into the polymer can include: Melt-compounding of graphene into the polymer; in-situ polymerisation of the polymer with the graphene, and; solution blending. Whichever technique is used, it is desirable that the graphene is sufficiently dispersed to achieve electrical conductivity with a minimum of graphene.

In some cases, additives are required to reduce phase separation of the graphene and the polymer.

A preferred embodiment is where the geosynthetic sensor includes fibres that include graphene. The fibre can be formed by melt extrusion from pellets or powders of the polymer. The graphene is added to the melt extrusion in a concentrated form dispersed in a carrier polymer, which may be the same as the bulk polymer, or may be different. The concentrated form of the graphene polymer dispersion is mixed and diluted in the melt extrusion process to obtain the desired concentration of graphene in the fibres.

In another embodiment, the concentrated form of the graphene is dispersed in a fluid, such as: oil, solvent or water.

The textile may be wholly formed from the conductive fibre or partially from conductive fibre and partially from non-conductive fibre.

In another embodiment, the textile contains metal fibres.

In a further embodiment, the geosynthetic is coated with graphene or with a mixture that contains graphene.

In a further embodiment the geosynthetic contains fibres that are coated with a conductive substance, such as graphene or metal or other conductive carbons.

Example 1: An Electrically Conductive Coating on a Geotextile was Prepared by blade coating an acrylic dispersion of graphene onto an approximately 190 gsm (grams per square meter) commercial non-woven, needle-punched polyester geotextile. Twelve thousand square meters of geotextile were coated on one side with 20 gsm (dry weight) of dispersion. The coated geotextile was dried at 150° C. for 2 minutes in an inline stentor oven.

The dry graphene content equated to 5 gsm. The conductive side of the dry coated geotextile had a sheet resistance of 1000 Ohms per square. The non-coated side was an electrical insulator.

A first layer of four lengths of the coated geotextile was arranged on an electrically insulating surface. Each length was approximately 11 cm wide by 40 cm long. The lengths were laid in parallel with conductive side facing up with a 1 cm overlap of each length's edge. A second layer of four lengths was laid on top of the first layer with the lengths arranged at right angles to the lengths in the first layer. The second layer was also laid with an edge overlap and with the conductive surface facing up. A wire was attached to one end of each length.

The electrical resistance between every combination of lengths was measured with a multimeter and found to be unmeasurably high on the instrument used (i.e. effectively electrically insulating). When water was applied to the array at the intersection of the second length in the first layer and the second length in the second layer the electrical resistance between the two lengths decreased as the amount of water increased.

The presence of water was measured by the water creating an electrical connection between the two layers. As the water spread across the layers further electrical connections were formed and additional decreases in resistance between lengths in the first layer and lengths in the second layer were measured allowing the presence of water to be located and the rate at which it spread to be measured.

Example 2: The Arrangement of Example 1 was Used to Measure the Effect of pressure on the array. The capacitance between each of the lengths in the first layer and each of the lengths in the second layer was measured to be approximately 0.07 nanoFarads (nF). When a 250 g weight (of diameter 8 cm) was placed on the array, the capacitance between the lengths in each layer where the weight was applied increased to approximately 0.10 nF.

When the weight was applied to the array such that two or more lengths in each layer were subjected to pressure, the increase in capacitance was lower, for example increasing to 0.09 nF where the weight was applied to the intersection of two lengths in the first layer, but only one length in the second layer.

When the weight was applied over the intersection of two lengths in the first layer and two lengths in the second layer the capacitance increase was observed to be 0.08 nF.

The above change in capacitance was found to be reproducible.

Geosynthetic Cementitious Composite Mats (GCCMs) are a class of geosynthetic material with a wide range of geotechnical applications. They are flexible concrete impregnated fabrics that harden on hydration to form a thin, durable, water proof and fire resistant concrete layer.

GCCMs typically consist of a 3-dimensional fibre matrix containing a high early-strength concrete mix. A PVC backing on one surface provides a waterproof capability and the internal fibre matrix prevents crack propagation and provides tensile reinforcement once set. This allows GCCMs to provide a range of benefits over conventional concrete including speed of installation and logistical advantages.

It is possible to incorporate a sensor as described above per the invention as an outer layer of a GCCM to provide a means for detecting leaks, damage, the presence to absence of water etc.

It will be appreciated by those skilled in the art that the above described embodiments are merely several examples of how the inventive concept can be implemented. It will be understood that other embodiments may be conceived that, while differing in their detail, nevertheless fall within the same inventive concept and represent the same invention.

The invention claimed is:

1. A sensor that incorporates an arrangement of a first layer of lengths of geosynthetic and a second layer of lengths of geosynthetic, wherein the first layer of lengths of geosynthetic and the second layer of lengths of geosynthetic each include non-woven lengths of geosynthetic coated on at least one side with an electrically conductive coating, wherein the lengths of geosynthetic in the first layer are substantially electrically isolated from the lengths of geosynthetic in the second layer, and wherein a change in electrical resistance or capacitance between one or more of the lengths in the first layer and one or more of the lengths in the second layers is configured to detect a change in any one or more of: pressure; strain; water content; or temperature.

2. The sensor according to claim 1 where one or both of the geosynthetic layers are composed of geotextile.

3. The sensor according to claim 1 where one or both of the geosynthetic layers is composed of any one of: geomembrane; geogrid; geomesh; geonet; geosynthetic clay liner (GCL); geofoam; geocell; or geocomposite.

4. The sensor according to claim 1 where each of the layers are composed of lengths of electrically conductive geosynthetic that, at the voltages used to measure resistance or capacitance, are electrically isolated from lengths adjacent in the same layer and at voltages much higher than those used to measure resistance or capacitance are electrically connected.

5. The sensor according to claim 4 wherein said lengths of geosynthetic in each of the said layers are arranged in an angular relationship to those in an adjacent layer.

6. Use of the sensor according to claim 4 wherein resistance is measured between each end of each of said lengths of geosynthetic.

7. Use of the sensor according to claim 6, wherein an electrical connection to measure the resistance is formed by closing one or more switches.

8. The sensor according to claim 1, wherein the resistance and/or capacitance between one length of geosynthetic in a first layer and another length of geosynthetic in a second layer is measured.

9. The sensor according to claim 8, wherein an electrical connection to the measurement circuit is formed by closing one or more switches.

10. A non-woven geosynthetic coated on at least one side with an electrically conductive coating, configured to form one or more end-to-end electrical pathways that change in resistance and/or capacitance when pressure or strain or water content or temperature changes occur, wherein the end-to-end electrical pathways are substantially electrically isolated from one another, and wherein the end-to-end electrical pathways are arranged in a first layer and in a second layer at an angle to the first layer.

11. The geosynthetic according to claim 10, wherein the geosynthetic contains some textile and/or fibers.

12. The geosynthetic according to claim 11, wherein an electrical conduction has been created by incorporating conductive carbon or metal onto or into the textile and/or fibers, and wherein the conductive carbon is primarily graphene.

13. The geosynthetic according to claim 10, wherein the geosynthetic is one of a geomembrane; a geogrid; a geomesh; a geonet; a geosynthetic clay liner (GCL); a geofoam; a geocell; or a geocomposite.

14. The geosynthetic according to claim 10, wherein the electrical conductivity is provided by a coating containing graphene on the geosynthetic.

15. The geosynthetic according to claim 10, further incorporating two or more areas of electrical conductivity separated by one or more electrically insulating areas.

16. The geosynthetic according to claim 10, wherein the electrical conductivity of the geosynthetic is sufficient to allow electrical spark or arc inspection for holes in an overlying barrier layer.

17. The sensor according to claim 1, wherein the lengths of geosynthetic in at least one of said layers has an electrical resistance that differs on each opposing surface.

18. The sensor according to claim 17, wherein the surfaces of highest electrical conductivity of the first layer are arranged in closest proximity to the surfaces of highest electrical conductivity of the second layer.

19. The geosynthetic according to claim 10, wherein the electrical conductivity is provided by a coating containing graphene on each side of the geosynthetic, and wherein each coating is substantially electrically isolated from the other.

20. The geosynthetic according to claim 19, wherein said coating is applied in a continuous length on a first side of the geosynthetic and as a discontinuous coating in a periodic pattern on a second side of the geosynthetic.

* * * * *